(12) United States Patent
Cheng et al.

(10) Patent No.: US 10,840,997 B2
(45) Date of Patent: Nov. 17, 2020

(54) REPEATER

(71) Applicant: WISTRON NEWEB CORPORATION, Hsinchu (TW)

(72) Inventors: Chieh-Wen Cheng, Hsinchu (TW); Horen Chen, Hsinchu (TW); Tsun-Che Huang, Hsinchu (TW); Shoou-Hann Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 16/529,846

(22) Filed: Aug. 2, 2019

(65) Prior Publication Data

US 2020/0145093 A1    May 7, 2020

Related U.S. Application Data

(60) Provisional application No. 62/754,594, filed on Nov. 2, 2018, provisional application No. 62/757,791, filed on Nov. 9, 2018, provisional application No. 62/778,296, filed on Dec. 12, 2018, provisional application No. 62/780,986, filed on Dec. 18, 2018, provisional application No. 62/784,564, filed on Dec. 24, 2018, provisional application No. 62/785,233, filed on Dec. 27, 2018.

(51) Int. Cl.
*H04B 7/155* (2006.01)
*H04B 7/06* (2006.01)

(52) U.S. Cl.
CPC ......... *H04B 7/1555* (2013.01); *H04B 7/0617* (2013.01); *H04B 7/0695* (2013.01)

(58) Field of Classification Search
CPC .... H04B 7/0617; H04B 7/0695; H04B 7/1555
See application file for complete search history.

(56) References Cited

U.S. PATENT DOCUMENTS

| | | | |
|---|---|---|---|
| 6,934,511 B1* | 8/2005 | Lovinggood | H01Q 1/007 343/702 |
| 9,544,715 B2* | 1/2017 | Nakano | H04W 4/80 |
| 2010/0297937 A1* | 11/2010 | Kim | H04B 7/1555 455/11.1 |
| 2011/0055875 A1* | 3/2011 | Zussman | H04Q 11/0067 725/65 |
| 2013/0201857 A1* | 8/2013 | Bhargava | H04K 3/28 370/252 |
| 2015/0009888 A1* | 1/2015 | Pitakdumrongkija | H04B 7/15507 370/315 |
| 2015/0215077 A1* | 7/2015 | Ratasuk | H04B 7/088 455/436 |
| 2018/0191451 A1* | 7/2018 | Lynch | H04W 4/80 |
| 2018/0198515 A1* | 7/2018 | Lotter | H04B 7/088 |
| 2019/0320250 A1* | 10/2019 | Hoole | H04L 27/2637 |

* cited by examiner

*Primary Examiner* — David B Lugo
(74) *Attorney, Agent, or Firm* — McClure, Qualey & Rodack, LLP

(57) ABSTRACT

A repeater includes a donor device, a service device, a control board circuit and a processing circuit. The repeater provides beam selection mechanisms applicable to several scenarios for base stations and CPE, in which an adaptive gain control mechanism can be utilized to reduce oscillations in a down-link circuit and an up-link circuit of the control board circuit.

17 Claims, 14 Drawing Sheets

REPEATER

CROSS-REFERENCE TO RELATED PATENT APPLICATION

This application claims priority from the U. S. Provisional Patent Applications Ser. No. 62/754,594 filed Nov. 2, 2018, No. 62/757,791 filed Nov. 9, 2018, No. 62/778,296 filed Dec. 12, 2018, No. 62/780,986 filed Dec. 18, 2018, No. 62/784,564 filed Dec. 24, 2018, and No. 62/785,233 filed Dec. 27, 2018, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a repeater, and more particularly to a repeater having adaptive gain control and beam selection mechanism.

BACKGROUND OF THE DISCLOSURE

Fifth generation (5G) communications systems provide a dramatic increase in data rates over existing technologies while allowing network access for many devices. In order to meet system demands for capacity and throughput, antennas with high gain and multi-beams are required. Furthermore, the high data rates anticipated for 5G encourage the use of millimeter wave frequency bands in addition to the traditional frequency bands used by earlier mobile technologies such as 4G; 3G, etc.

In the 5G mobile communication, both sub-6 GHz and above-6 GHz frequency bands will be used. In order to provide ubiquitous 5G coverage for both outdoor and indoor environments, repeaters are often required to extend transmission distance and coverage. However, interferences between transmitting and receiving ends of the repeaters can be severe.

SUMMARY OF THE DISCLOSURE

In response to the above-referenced technical inadequacies, the present disclosure provides a repeater having adaptive gain control and beam selection mechanism.

In one aspect, the present disclosure provides a repeater including a donor device, a service device, a control board circuit and a processing circuit. The donor device includes a first receiving antenna array, a first transmitting antenna array, and a first antenna controller configured to control the first receiving antenna array and the first transmitting antenna array to receive and transmit data from at least one base station. The service device includes a second transmitting antenna and a second receiving antenna, and a second antenna controller configured to control the second transmitting antenna and the second receiving antenna to receiving and transmit data from and to a customer premise equipment (CPE). The control board circuit includes a down-link (DL) circuit and an up-link circuit, the down-link (DL) circuit is coupled to the first receiving antenna array and the second transmitting antenna, and the up-link circuit is coupled to the second receiving antenna and the first transmitting antenna array. The processing circuit includes a power detector, a processing unit, and a memory circuit. The power detector is configured to detect first signal intensities of signals transmitted in the DL circuit, the memory circuit is coupled to the processing unit. The processing unit is configured to: control the first antenna controller to control the first receiving antenna array to form a plurality of first radiation patterns having a plurality first radiation directions, respectively; control the first antenna controller to control the first receiving antenna array to receive signals from at least one base station through the plurality of first radiation patterns, respectively; control the power detector to detect the first signal intensities of the received signals transmitted in the DL circuit; control the first antenna controller to select, according to the first signal intensities, one of the first radiation patterns having the maximum first signal intensity for the first receiving antenna array and the first transmitting antenna array to receive and transmit the signals from and to a first base station of the at least one base stations; control the second antenna controller to send the received signals from the first antenna array to the CPE through the second transmitting antenna; control the second antenna controller to control the second receiving antenna to receive a first feedback signal including connection status of the CPE from the CPE; and determine, according to the first feedback signal, whether the CPE can be serviced by the first base station.

In certain embodiments, the down-link (DL) circuit includes a first low noise amplifier (LNA) coupled to the first receiving antenna array, a first buffer circuit coupled to the first LNA, and a first power amplifier (PA) coupled between the first buffer circuit and the second transmitting antenna. The up-link circuit includes a second low noise amplifier (LNA) coupled to the second receiving antenna, a second buffer circuit coupled to the second low noise amplifier, and a second power amplifier (PA) coupled between the second buffer circuit and the first transmitting antenna array.

In certain embodiments, if the processing unit determines, according to the first feedback signal, that the CPE cannot be serviced by the first base station, the processing unit is further configured to perform the following steps: controlling the first antenna controller to select, according to the first signal intensities, one of the first radiation patterns having the secondly maximum signal intensity for the first receiving antenna array and the first transmitting array to receive and transmit signals from and to one of the at least one base station; controlling the second antenna controller to send the received signals processed through the down-link circuit to the CPE through the second transmitting antenna; receiving a second feedback signal including the connection status of the CPE from the CPE; determining, according to the second feedback signal received by the repeater, whether the CPE can be serviced by the one of the at least one base station.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
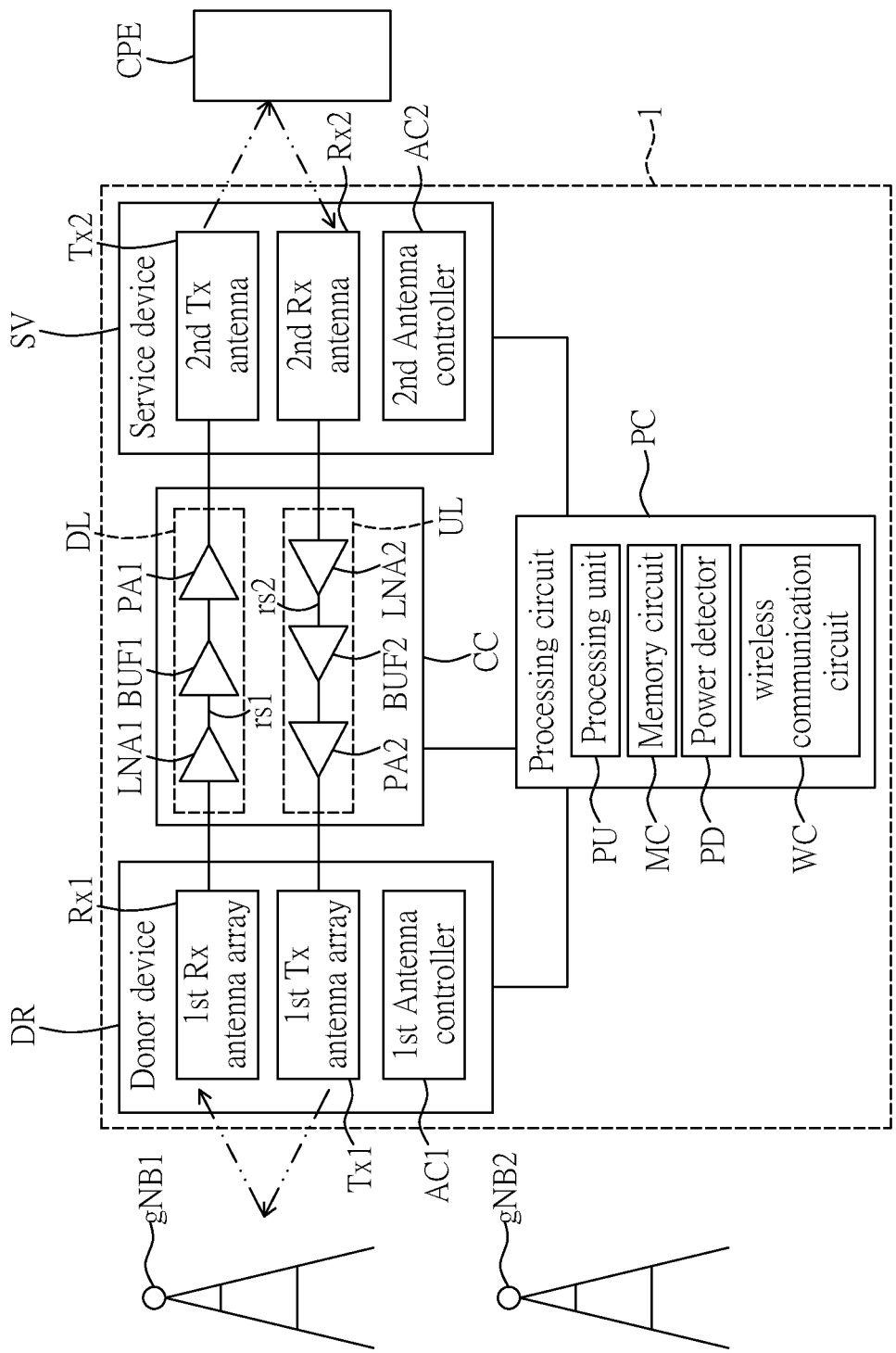
FIG. 1 is a block diagram of a repeater according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
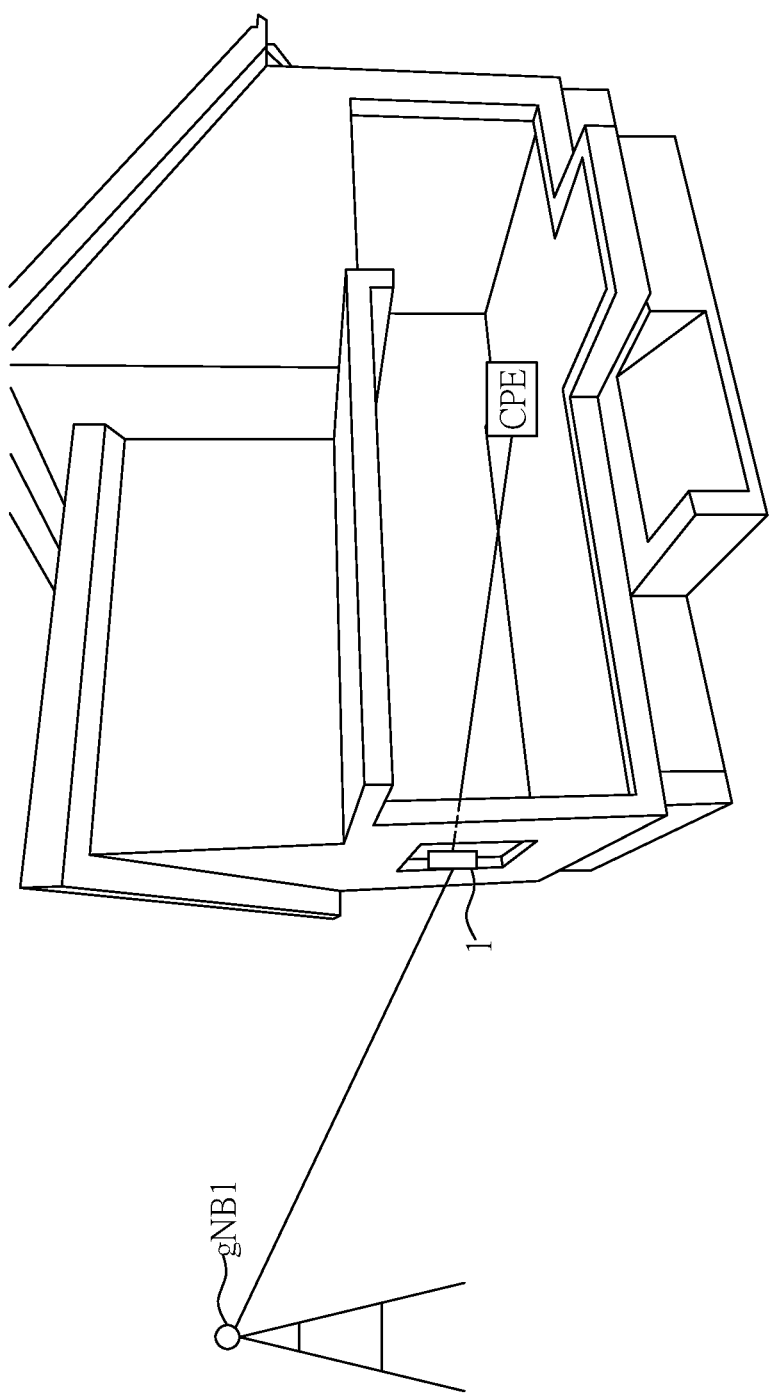
FIG. 2 is a schematic view showing a typical usage scenario of a repeater according to an embodiment of the present disclosure.

FIG. 1 is a block diagram of a repeater according to an embodiment of the present disclosure, and FIG. 2 is a schematic view showing a typical usage scenario of a repeater according to an embodiment of the present disclosure. Referring to FIGS. 1 and 2, the present disclosure provides a repeater 1 including a donor device DR, a service device SV, a control board circuit CC, and a processing circuit PC.

In certain cases, a direct path of transmission between a base station gNB1 or a base station gNB2, and a customer premise equipment CPE is blocked by an obstacle, such as a building, which results in a path loss larger than a predetermined value, e.g., 140 dB, the repeater 1 can be arranged to provide an alternative path between the base station gNB1 or the base station gNB2, and the customer premise equipment CPE, such that the path loss can be reduced.

In telecommunications, the customer premise equipment CPE can be any terminal and associated equipment located at a subscriber's premises and connected with a carrier's telecommunication circuit at a demarcation point. The demarcation point is a point established in a building or complex to separate customer equipment from the equipment located in either the distribution infrastructure or central office of the communications service provider. The customer premise equipment CPE may include various types of terminal equipment to process received signals to thereby enable subscribers to access to the services.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In the present embodiment, the donor device DR includes a first receiving antenna array Rx1, a first transmitting antenna array Tx1, and a first antenna controller AC1 configured to control the first receiving antenna array Rx1 and the first transmitting antenna array Tx1 to receive and transmit data from at least one base station gNB1.

In detail, the donor device DR is utilized to provide a donor link to the base station gNB1 or the base station gNB2. The donor device DR has the first antenna controller AC1 to control the first receiving antenna array Rx1 and the first transmitting antenna array Tx1 with beam-steering to provide a higher link margin to accommodate a longer line of sight (LOS) or non-line of sight (NLOS) distance to the base station gNB1 or the base station gNB2, and higher penetration loss through the house wall/window for the indoor repeater 1. The first antenna controller AC1 in the donor device DR can receive commands from the processing circuit PC to configure phase and gain to control the first receiving antenna array Rx1 and the first transmitting antenna array Tx1 to form different antenna beams. The first antenna controller AC1 also configures a power management unit (PMU) in the donor device DR to generate necessary powers for the donor device DR.

The service device includes a second transmitting antenna Tx2 and a second receiving antenna Rx2, and a second antenna controller AC2 configured to control the second transmitting antenna Tx2 and the second receiving antenna Rx2 to receive and transmit data from and to a customer premise equipment CPE.

In detail, the service device SV provides a service link to the customer premise equipment CPE. The service device SV has the second antenna controller AC2 to control the second transmitting antenna Tx2 and the second receiving antenna Rx2 with beam-steering. The second antenna controller AC2 in the service device SV can receive commands from the processing circuit PC to configure phase and gain to control the second transmitting antenna Tx2 and the second receiving antenna Rx2 to form desired antenna patterns. The second antenna controller AC2 also configures a power management unit (PMU) in the service device SV to generate necessary powers for the service device SV.

The control board circuit CC includes down-link circuit DL coupled to the first receiving antenna array Rx1 and the second transmitting antenna Tx2 and an up-link circuit UL coupled to the second receiving antenna Rx2 and the first transmitting antenna array Tx1.

As shown in FIG. 2, signals from the base station gNB are received by the repeater 1, and an internal RF circuit of the repeater is applied to transmit received signals to the customer premise equipment CPE. In certain embodiment, the donor device DR and the service device SV of the repeater 1 can be an outdoor unit and an indoor unit, respectively. Signals from the base station gNB are received by the outdoor unit, and an internal RF circuit is applied to transmit received signals to the indoor unit, i.e., the service device SV. The indoor unit then communicates with the customer premise equipment CPE and transfer data. In another embodiment, the outdoor unit can be located indoor near or on a window to simplify the installation. The internal RF circuit can be, for example, the down-link circuit DL or the up-link circuit UL.

In more detail, the down-link circuit DL includes a first low noise amplifier LNA1 coupled to the first receiving antenna array Rx1, a first buffer circuit BUF1 coupled to the first low noise amplifier LNA1, and a first power amplifier PA1 coupled between the first buffer circuit BUF1 and the second transmitting antenna Tx2.

The up-link circuit UL includes a second low noise amplifier LNA2 coupled to the second receiving antenna Rx2, a second buffer circuit BUF2 coupled to the second low noise amplifier LNA2, and a second power amplifier PA2 coupled between the second buffer circuit BUF2 and the first transmitting antenna array Tx1.

Regarding to the down-link circuit DL, signals are transmitted from the base station gNB1 or the base station gNB2 to the first receiving antenna array Rx1, and then transmitted through the first low noise amplifier LNA1, the first buffer circuit BUF1, and the first power amplifier PA1 to reach the second transmitting antenna Tx2. After the signals are amplified by the first low noise amplifier LNA1 and the first power amplifier PA1, the signals with higher levels are transmitted from the second transmitting antenna Tx2 to the customer premise equipment CPE.

Similar to the down-link circuit DL, signals in the up-link circuit UL are transmitted from the customer premise equipment CPE to the second receiving antenna Rx2, and then transmitted through the second low noise amplifier LNA2, the second buffer circuit BUF2, and the second power amplifier PA2 to reach the first transmitting antenna array Tx1. After the signals are amplified by the second low noise amplifier LNA2 and the second power amplifier PA2, the signals with higher levels are transmitted from the first transmitting antenna array Tx1 to the base station gNB1 or the base station gNB2.

Since the signals are amplified in the down-link circuit DL and up-link circuit UL, oscillations can be detected in the down-link circuit DL and up-link circuit UL, respectively. Therefore, various configurations are provided in the present disclosure to reduce oscillation while maintaining good signal to noise ratio (SNR).

The repeater 1 of the present disclosure further includes a processing circuit PC including a power detector PD configured to detect first signal intensities of signals transmitted in the down link circuit DL, a processing unit PU, a memory circuit MC coupled to the processing unit PU, and the wireless communication circuit WC.

Specifically, the processing circuit PC can include a microcontroller (MCU) as the power detector PD to configure a threshold for received signal strength indication (RSSI) detection in the down-link circuit DL and the up-link circuit UL of the control board circuit CC, and configure the donor device DR and service device SV for beam-steering. The processing circuit PC can also include a Universal Asynchronous Receiver/Transmitter (UART) over a universal serial bus (USB) interface to connect to an external computer system for diagnostics and calibrations. The MCU also configures a power management unit (PMU) in the processing circuit PC to generate necessary powers for the processing circuit PC. The processing circuit PC may configure the wireless communication circuit WC, such as Wi-Fi or Bluetooth to communicate with the customer premise equipment CPE for out of band signaling. In certain embodiments, the processing circuit PC may also configure a wired communication circuit, such as an Ethernet chip to communicate with the customer premise equipment CPE for out of band signaling.

In more detail, the power detector PD is configured to detect a first received signal strength indication (RSSI) of a first signal rs1 from the first LNA, and the processing unit PU is configured to determine whether the first RSSI is higher than a first threshold or lower than a second threshold. If the first RSSI is determined to be higher than the first threshold, the processing unit PU is configured to adjust a gain of the first power amplifier PA1 to be decreased. If the first RSSI is determined to be lower than the second threshold, the processing unit PU is configured to adjust the gain of the first power amplifier PA1 to be increased.

In more detail, a coupler can be provided between the first low noise amplifier LNA1 and the first buffer circuit BUF1 to divide a control flow from a signal flow. The control flow is performed through millimeter wave power detector, that is, the power detector PD, and the processing unit PU. The power detector PD can obtain amplitude and calculate RSSI according to the amplitude of the first received signal rs1 when the first receiving antenna array Rx1 receives signals in a predetermined beam direction. An output of the power detector PD is connected to the processing unit PU having one output to control on and off states of the first power amplifier PA1.

For example, when the amplitude of the first received signal rs1 exceeds a threshold, the processing unit PU outputs a first switch signal to turn on the first power amplifier PAL When the amplitude of the first received signal rs1 is lower than the threshold, the processing unit PU outputs a second switch signal to turn off the first power amplifier PA1, thereby avoiding coupling interferences from the transmitting end to the receiving end of the repeater 1 to obtain a better isolation.

Similarly, the power detector PD can be configured to detect a second received signal strength indication (RSSI) of a second signal rs2 from the second low noise amplifier LNA2, and the processing unit PU is configured to determine whether the second RSSI is higher than a fourth threshold or lower than a fifth threshold.

If the second RSSI is determined to be higher than the fourth threshold, the processing unit PU is configured to adjust a gain of the second power amplifier PA2 to be decreased. If the second RSSI is determined to be lower than the fifth threshold, the processing unit PU is configured to adjust the gain of the second power amplifier PA2 to be increased.

In certain embodiments, the processing unit PU can be further configured to determine whether the first RSSI is lower than a third threshold. If the first RSSI is lower than the third threshold, the processing unit PU is configured to turn off the first PA, and the third threshold is lower than the second threshold. In this case, the third threshold is provided to avoid output leakage from the down-link circuit DL into an input of the up-link circuit UL, thereby enhancing the isolation between the up-link circuit UL and the down-link circuit DL.

Similarly, the processing unit PU can also be configured to determine whether the second RSSI is lower than a sixth threshold. If the second RSSI is lower than the sixth threshold, the second control circuit is configured to turn off the first PA, and the sixth threshold is lower than the fifth threshold. The fifth threshold is provided to avoid output leakage from the up-link circuit UL into an input of the down-link circuit DL, thereby enhancing the isolation between the up-link circuit UL and the down-link circuit DL.

Therefore, when oscillation is detected by the power detector PD, the processing unit PU can adjust the gain of the down-link circuit DL or the up-link circuit UL, or both, so as to reduce the oscillation while maintaining good SNR. Furthermore, the processing unit PU can further control the first antenna controller AC1 to adjust numbers of antenna elements used in the first receiving antenna array Rx1 and the first transmitting antenna array Tx1, thereby reducing the oscillation.

In certain cases, an AI machine leaning mechanism can be used to detect the operation environment for the donor link or service link. Predefined parameters for the detected environment can be used as the initial repeater configuration, since outdoor foliage may change in different seasons or new buildings may be constructed nearby. In these cases, the existing power control mechanism between the base station gNB1 or gNB2 and the customer premise equipment CPE can be used to adapt the environment changes. However, fixed gain used in the existing power control mechanism for these cases may have radio signal oscillation. Therefore, the adaptive gain control mechanism provided by the present disclosure can be used to slowly change the gains of the repeater 1, either in the up-link circuit UL or the down-link circuit DL, to reduce the oscillation.

Moreover, the processing unit PU can be further configured to generate time duplex division synchronization (TDD sync) signals for half-duplex controlling the down-link circuit DL and the up-link circuit UL while data transmission between the donor device DR and the base station gNB1 and data transmission between the service device SV and the customer premise equipment CPE are performed simultaneously.

In detail, the processing unit PU can generate the TDD sync signals for TDD switching control the down-link circuit DL and the up-link circuit UL by detecting the RSSI from one of the down-link circuit DL and the up-link circuit UL. If the customer premise equipment CPE is transmitting signals, then a radio path in the opposite direction, that is, the down-link circuit DL, should be turned off in the repeater 1 to avoid interference, and the TDD sync signals may be generated by using fast RSSI detector and a threshold logic.

Specifically, the processing unit PU is further configured to generate the TDD synchronization signals to respectively enable or disable the DL circuit and the UL circuit according to the first signal intensities and the second signal intensities detected by the power detector PD.

Figure 3:
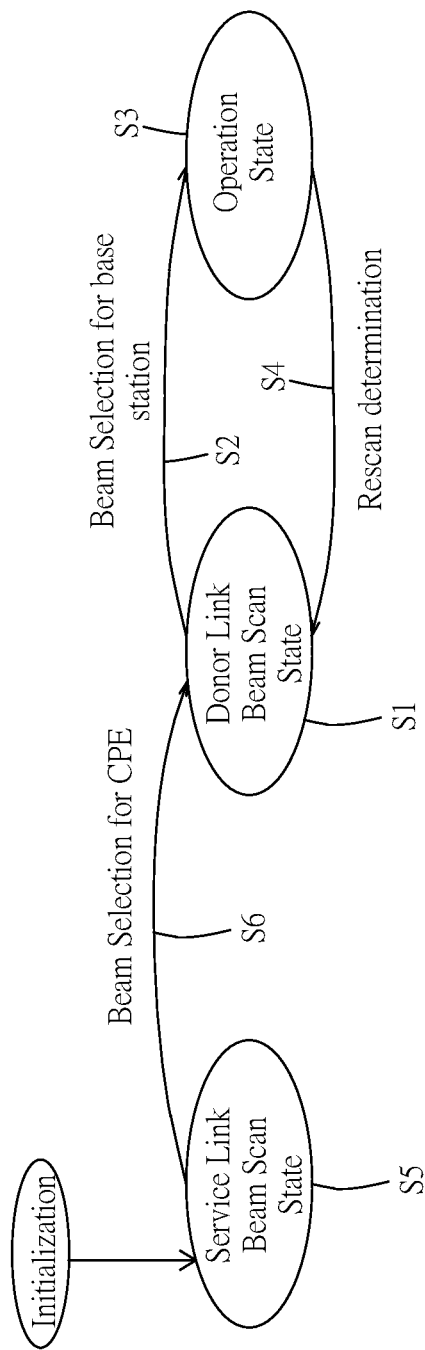
FIG. 3 is a state diagram showing functions of the repeater according to an embodiment of the present disclosure.

Reference is made to FIG. 3, which is a state diagram showing functions of the repeater according to an embodiment of the present disclosure. As shown in FIG. 3, functions of the repeater 1 include:

S1: Donor link beam scan state;
S2: Beam selection for base station;
S3: Operation state;
S4: Rescan determination;
S5: Service link beam scan state; and
S6: Beam selection for customer premise equipment.

In the function S1, a donor link beam selection mechanism (described below) may be executed by the donor device DR to select an antenna beam to forward radio signal to/from the base station gNB1 or gNB2.

Figure 4A:
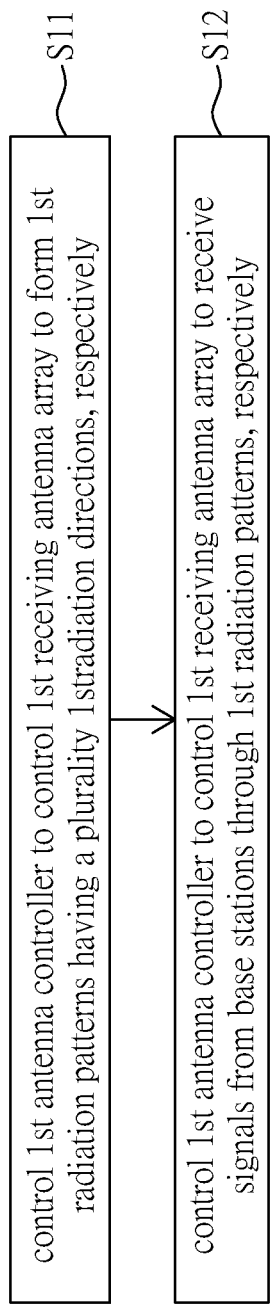
FIG. 4A is a flowchart of the function S1 according to an embodiment of the present disclosure.

Referring to FIG. 4A, which is a flowchart of the function S1 according to an embodiment of the present disclosure. In the function S1, the processing unit PU is configured to:

Step S11: control the first antenna controller AC1 to control the first receiving antenna array Rx1 to form a plurality of first radiation patterns having a plurality first radiation directions, respectively. It should be noted that the plurality of first radiation directions can be different from one another and direct to cover an angle from 0 to 360 degrees around the first antenna receiving array Rx1.

Step S12: control the first antenna controller AC1 to control the first receiving antenna array Rx1 to receive signals from at least one base station through the plurality of first radiation patterns, respectively.

Specifically, the processing unit PU configures the donor device DR to select an antenna beam and the power detector PD to detect RSSI in the control board circuit CC to measure the received signal strength from the base station gNB1 or gNB2.

For example, a time period for performing the antenna selection mechanism may need N*5 ms+(N−1)*20 ms, where N is a number of first radiation patterns, 5 ms is a time period to establish a window that 5G NR synchronization signal burst set broadcasted from the base station gNB1 or gNB2 confines, and 5 ms is a periodicity of a default SS Burst Set. In general, a time period for switching the radiation patterns can be ignored since a value thereof is merely several microseconds.

In the function S2, the repeater 1 can select one radiation pattern with the highest received signal strength as the best beam to the base station gNB1 or gNB2, and the repeater 1 can further adjust a gain of the first power amplifier PA1 according to the received signal strength from the base station gNB1 or gNB2.

Figure 4B:
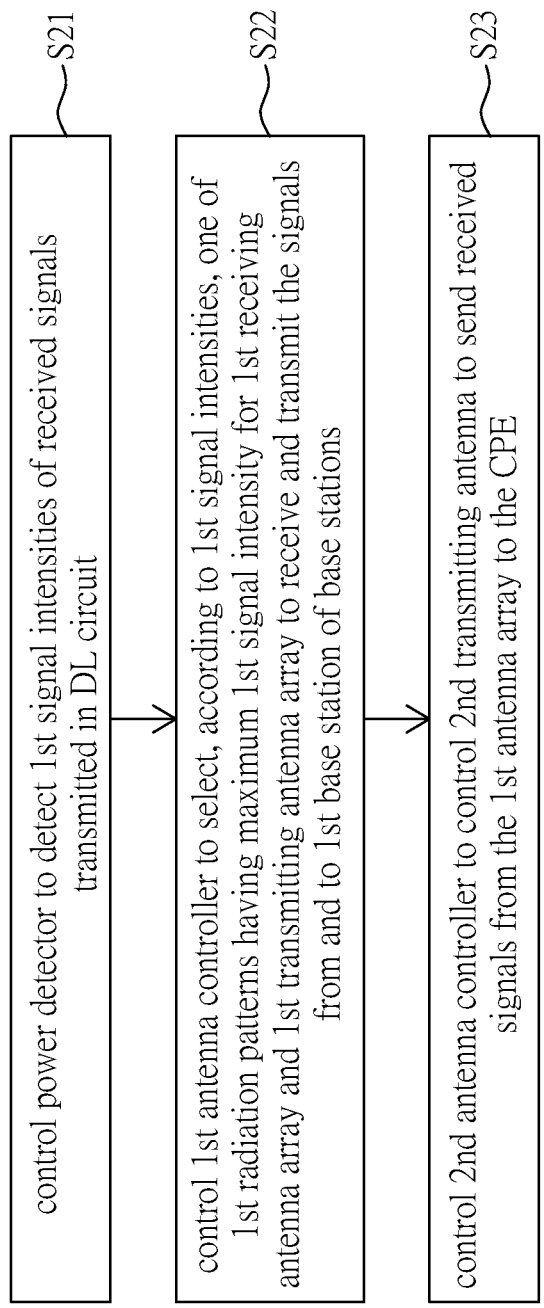
FIG. 4B is a flowchart of the function S2 according to an embodiment of the present disclosure.

Referring to FIG. 4B, which is a flowchart of the function S2 according to an embodiment of the present disclosure. In the function S2, the processing unit PU is configured to:

Step S21: control the power detector PD to detect the first signal intensities of the received signals transmitted in the down-link circuit DL.

Step S22: control the first antenna controller AC1 to select, according to the first signal intensities, one of the first radiation patterns having the maximum first signal intensity for the first receiving antenna array Rx1 and the first transmitting antenna array Tx1 to receive and transmit the signals from and to a first base station, such as the base station gNB1 of the base stations gNB1 and gNB2.

S23: control the second antenna controller AC2 to control the second transmitting antenna Tx2 to send the received signals from the first antenna array to the CPE.

Figure 4C:
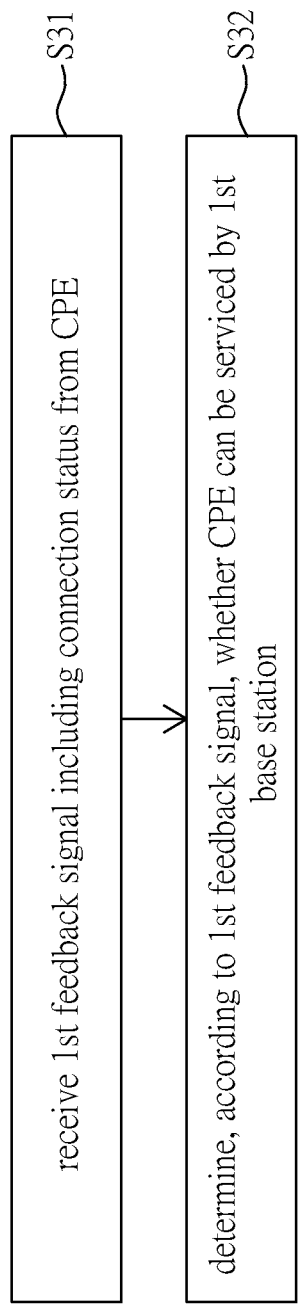
FIG. 4C is a flowchart of the function S3 according to an embodiment of the present disclosure.

Referring to FIG. 4C, which is a flowchart of the function S3 according to an embodiment of the present disclosure. In the function S3, the processing unit PU is configured to:

S31: receive a first feedback signal including connection status of the customer premise equipment CPE from the customer premise equipment CPE.

S32: determine, according to the first feedback signal, whether the customer premise equipment CPE can be serviced by the first base station, such as the base station gNB1.

Figure 5:
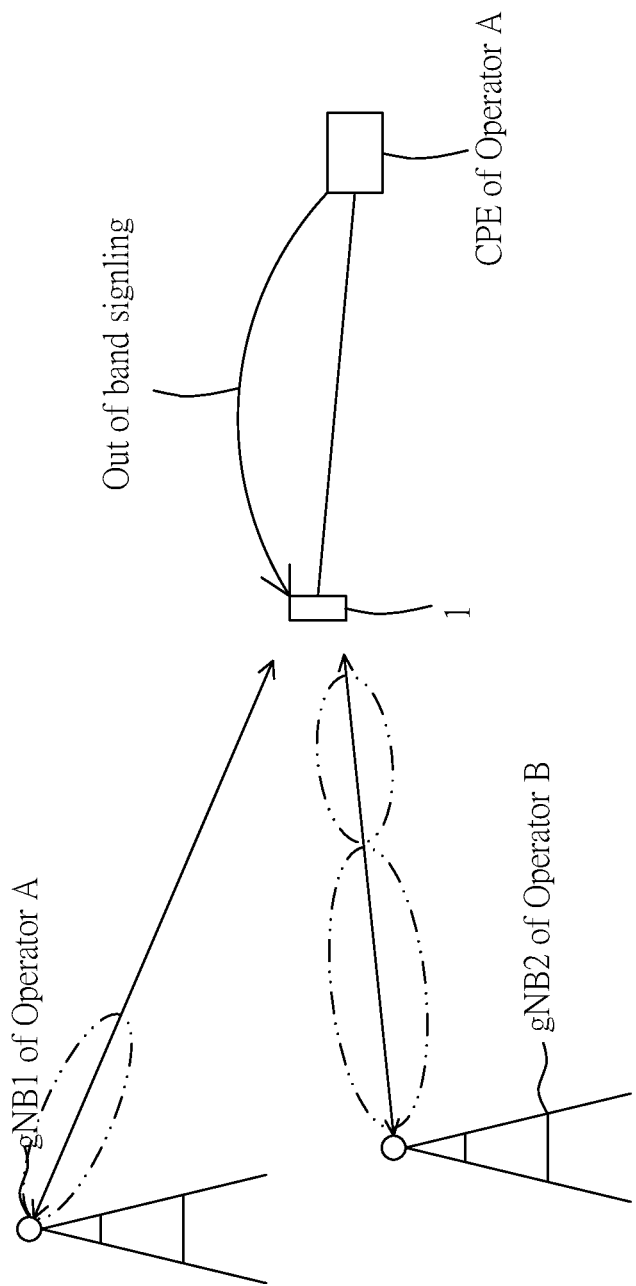
FIG. 5 is a schematic view showing a scenario in which a correct radiation pattern for the repeater is failed to be selected according to an embodiment of the present disclosure.

Reference is made to FIG. 5, which is a schematic view showing a scenario in which a correct radiation pattern for the repeater is failed to be selected according to an embodiment of the present disclosure. In certain cases, using the highest received signal power to select radiation pattern may fail to find the correct radiation pattern. As shown in FIG. 5, the base station gNB2 of Operator B is closer to the repeater 1 than the base station gNB2 of Operator A, therefore, the antenna beam point to the base station gNB2 of Operator B will be selected in the beam selection procedure, and the customer premise equipment CPE, as a subscriber of Operator A, cannot be serviced by the base station gNB2 accordingly.

Therefore, the first feedback signal, which can be an out of band control signal between the repeater 1 and the customer premise equipment CPE to be used in the present disclosure, such that the customer premise equipment CPE can inform the selected "5G channel/5G gNB physical cell id/selected SSB (Synchronization Block) index/connection status of the customer premise equipment CPE" to the repeater 1 for the antenna beam selection. That is, a data transmission provided between the service device SV and the CPE is in a first frequency band, and the first feedback signal is received by the repeater 1 in a second frequency band, and the first frequency band is different from the second frequency band.

Furthermore, the out of band signal can be transmitted wirelessly through Wi-Fi/Bluetooth by using the wireless communication circuit WC provided in the processing circuit PC, or the out of band signal can be transmitted through Ethernet by using the wired communication circuit provided in the processing circuit PC.

Figure 4D:
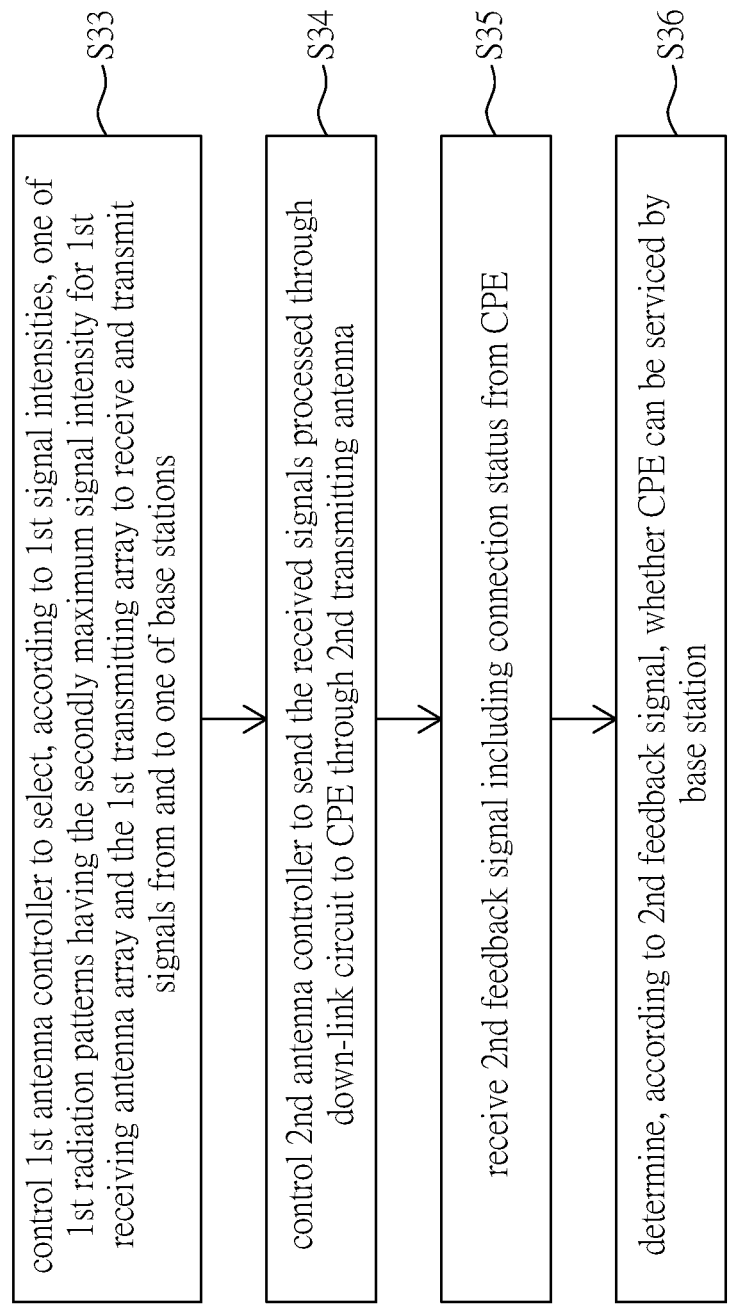
FIG. 4D is another flowchart of the function S3 according to an embodiment of the present disclosure.

Referring to FIG. 4D, which is another flowchart of the function S3 according to an embodiment of the present disclosure. As mentioned in FIG. 5, in the function S3, if the processing unit determines, according to the first feedback signal, that the customer premise equipment CPE cannot be serviced by the first base station, for example, the base station gNB1, the processing unit PU is further configured to:

Step S33: control the first antenna controller AC1 to select, according to the first signal intensities, one of the first radiation patterns having the secondly maximum signal intensity for the first receiving antenna array Rx1 and the first transmitting array Tx1 to receive and transmit signals from and to one of the base stations gNB1 and gNB2, for example, the base station gNB2.

Step S34: control the second antenna controller AC2 to send the received signals processed through the down-link circuit DL to the customer premise equipment CPE through the second transmitting antenna Tx2.

Step S35: receive a second feedback signal including the connection status of the customer premise equipment CPE from the customer premise equipment CPE.

Step S36: determine, according to the second feedback signal received by the repeater 1, whether the customer premise equipment CPE can be serviced by the one of the base stations gNB1 and gNB2.

Figure 4E:
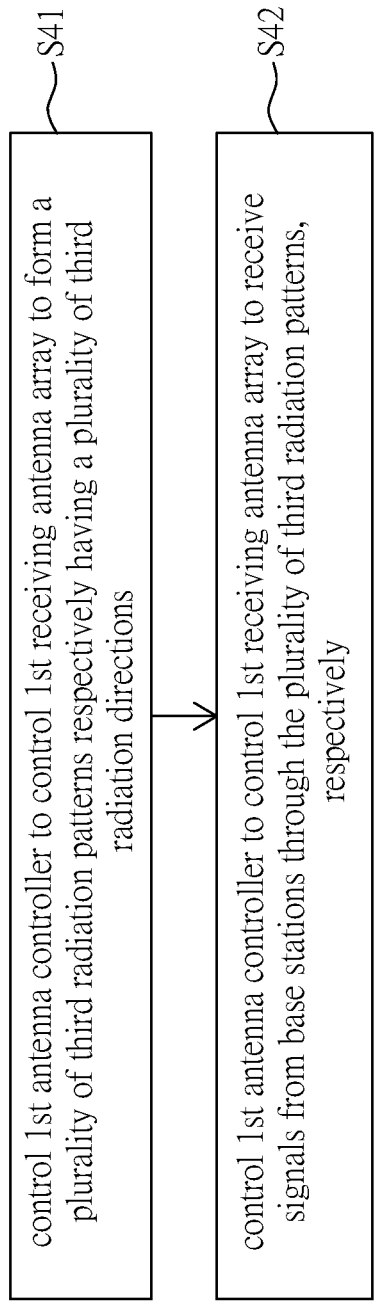
FIG. 4E is a flowchart of the function S4 according to an embodiment of the present disclosure.

Reference is made to FIG. 4E, which is a flowchart of the function S4 according to an embodiment of the present disclosure. The function S4 is triggered when a rescan request signal is received by the wireless communication circuit WC from the customer premise equipment CPE, or when the processing unit PU detects that the first signal intensities are less than a predetermined level within a predetermined time of period. In the function S4, the processing unit PU is further configured to:

S41: control the first antenna controller AC1 to control the first receiving antenna array Rx1 to form a plurality of third radiation patterns respectively having a plurality of third radiation direction.

S42: control the first antenna controller AC1 to control the first receiving antenna array Rx1 to receive signals from the base stations, such as base stations gNB1 and gNB2, through the plurality of third radiation patterns, respectively.

After the function S4 is executed, the processing unit PU is further configured to execute the function S3 again, thereby ensuring that the customer premise equipment CPE can be serviced by the base station gNB1 or gNB2.

For the function S5, a service link beam selection mechanism can be provided according to a configuration of the customer premise equipment CPE.

Figure 6A:
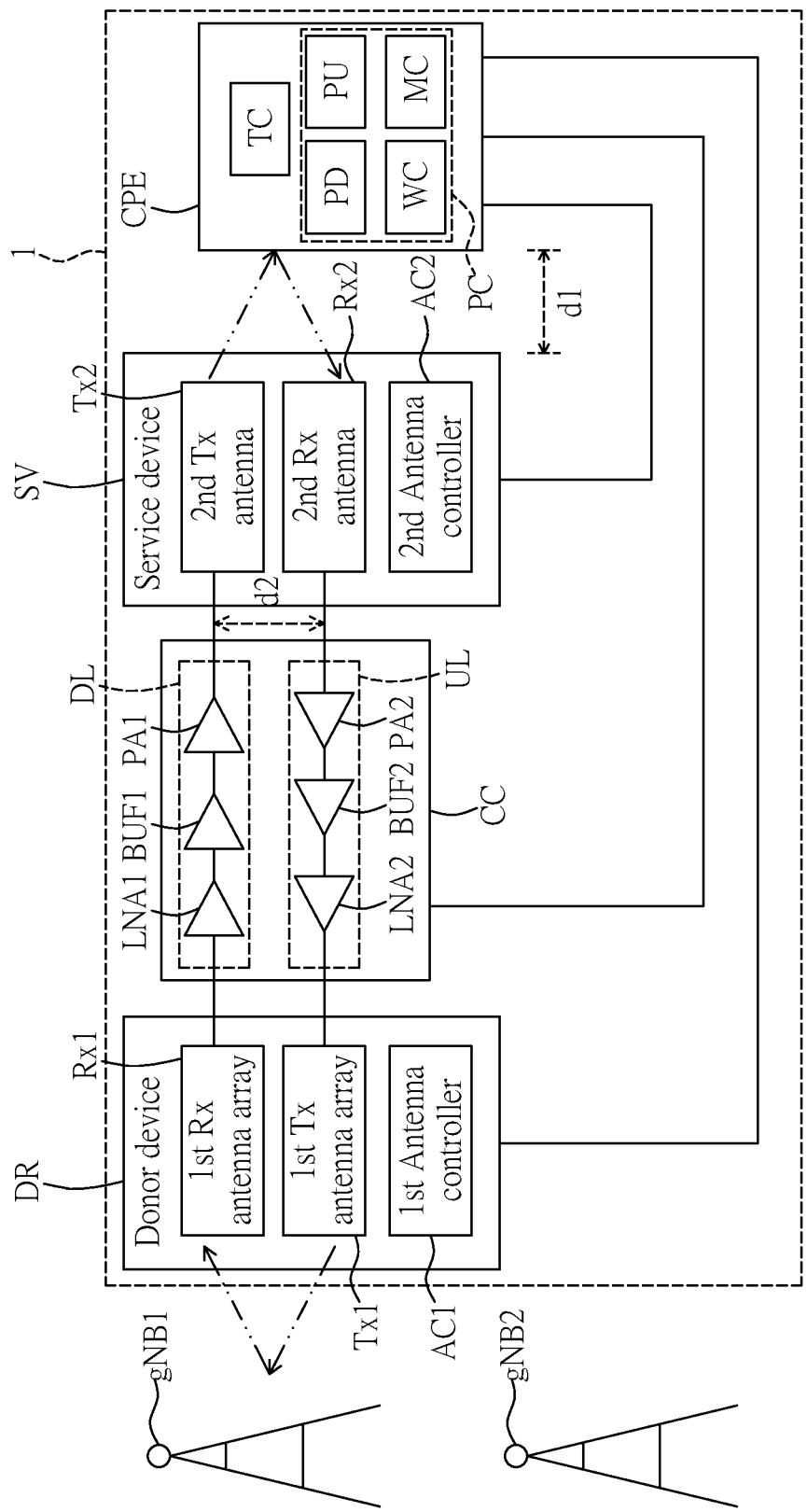
FIG. 6A is another block diagram of a repeater according to an embodiment of the present disclosure.
Figure 6B:
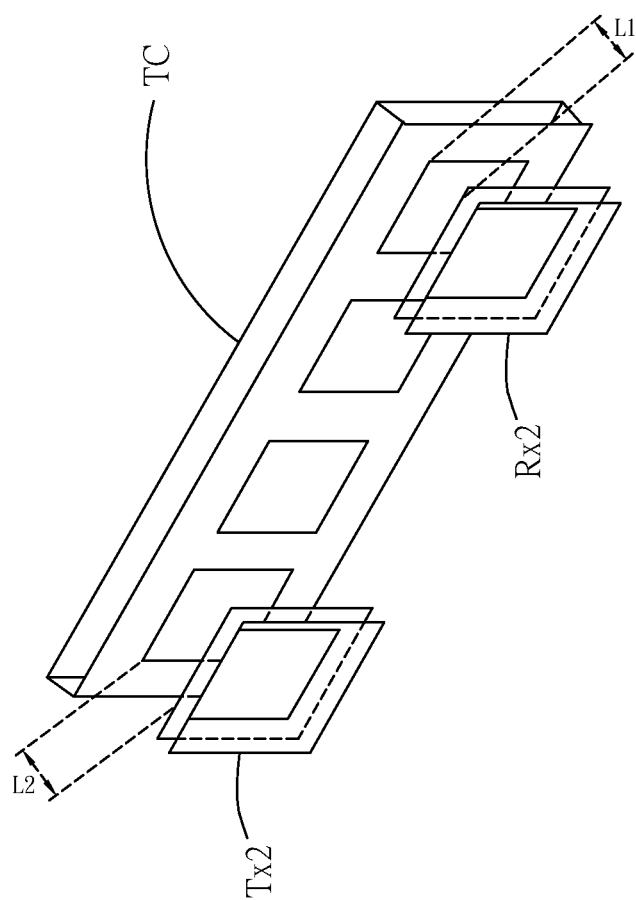
FIG. 6B is a perspective view showing configurations of the second transmitting antenna, the second receiving antenna and a transceiver of the customer premise equipment according to an embodiment of the present disclosure.

Referring to FIGS. 6A and 6B, FIG. 6A is another block diagram of a repeater according to an embodiment of the present disclosure, and FIG. 6B is a perspective view showing configurations of the second transmitting antenna, the second receiving antenna and a transceiver of the customer premise equipment according to an embodiment of the present disclosure.

As shown, the repeater 1 can further includes the customer premise equipment CPE mentioned in the previous embodiment. In this case, the customer premise equipment CPE can include the processing circuit PC and a transceiver TC. The processing circuit PC, as mentioned above, includes the power detector PD configured to detect first signal intensities of signals transmitted in the down link circuit DL, the processing unit PU, the memory circuit MC coupled to the processing unit PU, and the wireless communication circuit WC.

The distance between the customer premise equipment CPE and a primary part of the repeater 1 is defined as a distance d1. For 28 GHz millimeter wave, the distance d1 may be set typically to be less than 3 to 30 cm. Since the customer premise equipment CPE and primary part of the repeater 1 can be close to each other, an output power of the service link can be limited to a smaller value to simplify the design for preventing oscillation of signals in the repeater 1 and reduce the cost for a high-power service link.

Furthermore, a distance between the down-link circuit DL and the up-link circuit CL is defined as a distance d2. The distance d2 can range from 1 cm to 30 cm to provide enough path loss to minimize the cross-talk of the radio signal. This range is also small enough to put the primary part of the repeater 1 in one-box housing.

Referring to FIG. 6B, as shown, the second receiving antenna Rx2 and the second transmitting antenna Tx2 are disposed next to the transceiver TC of the customer premise equipment CPE with a first predetermined distance L1 and a second predetermined distance L2, respectively, and the first predetermine distance L1 and the second predetermined distance L2 range from 1 cm to 50 cm. Preferably, the first predetermine distance L1 and the second predetermined distance L2 can be less than 3 cm to 30 cm, which is similar to the distance d1.

In the present embodiment, the embedded customer premise equipment CPE can provide another option for generating TDD sync signals, in which the control information from the base station gNB1 or gNB2 is received and the TDD sync signals are generated by the embedded customer premise equipment CPE to control the down-link circuit DL or the up-link circuit UL to be switched.

In this case, the customer premise equipment CPE operated in a TDD mode by using the TDD sync signals, but the service device SV is operated with the full-time second transmitting antenna Tx2 and the full-time second receiving antenna Rx2 separately. The transceiver TC of the customer premise equipment CPE can choose corresponding antenna of the service device SV for transmitting or receiving signals.

Therefore, the function S5, that is, Service link beam scan state, is not needed for the embedded customer premise equipment CPE, which can provide cost effective and signal boost function for a millimeter wave wireless system.

The system can be designed to prevent the radio signal oscillation when utilizing the Space Division Duplex (SSD) path loss, antenna nulling, optional polarization diversity between the up-link circuit UL and the down-link circuit DL, and the TDD half-duplex repeater operation.

Figure 7:
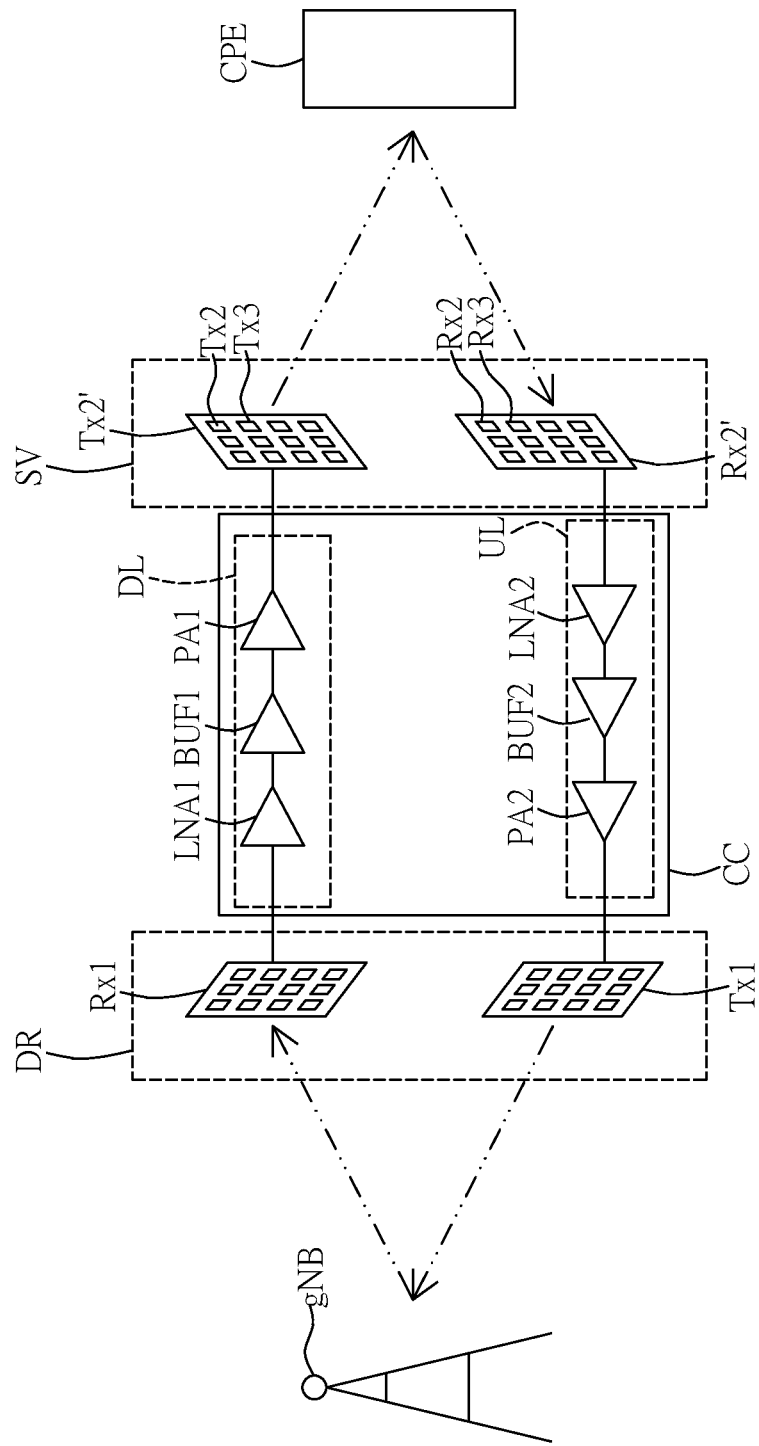
FIG. 7 is another block diagram of a repeater according to an embodiment of the present disclosure.

Reference is made to FIG. 7, which is another block diagram of a repeater according to an embodiment of the present disclosure. In the present embodiment, the service device further includes a second receiving antenna array Rx2' and a second transmitting antenna array Tx2'. The second receiving antenna array includes the second receiving antenna Rx2 and a plurality of third receiving antennas Rx3, and the second transmitting antenna array Tx2' includes the second transmitting antenna Tx2 and a plurality of third transmitting antennas Tx3.

Specifically, two modes are provided for the service device SV and include a dedicated mode and a non-dedicated mode. In the non-dedicated mode, when the configuration including the embedded customer premise equipment CPE is utilized, or when the service device SV is merely provided with omni-directional antennas, such us the second receiving antenna Rx2 and the second transmitting antenna Rx, the beam selection mechanism is not need.

Furthermore, the non-dedicated mode can also be utilized when the service device SV is configured to serve multiple customer premise equipment CPE, that is, a wider antenna beam, such as an omni-directional antenna beam, is utilized, the beam selection mechanism is not need, either. In this case, the second receiving antenna array Rx2' and the second transmitting antenna array Tx2' can be omni-directional antenna arrays.

Figure 4F:
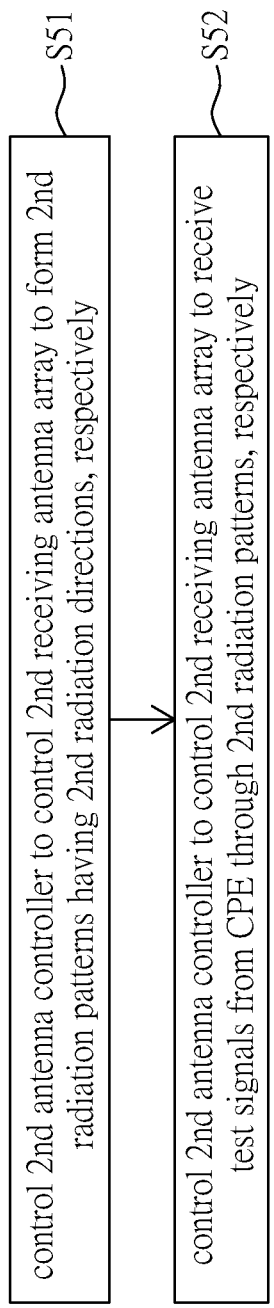
FIG. 4F is a flowchart of the function S5 according to an embodiment of the present disclosure.
Figure 4G:
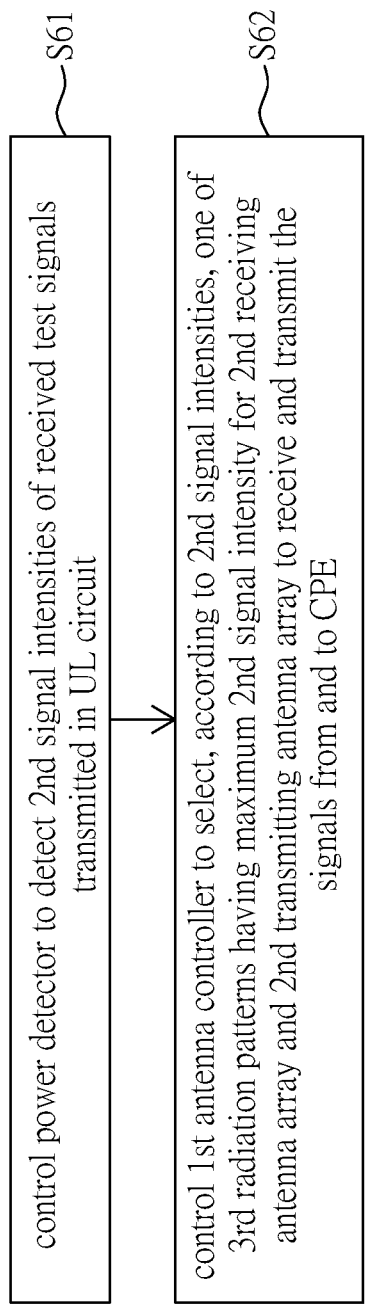
FIG. 4G is a flowchart of the function S6 according to an embodiment of the present disclosure.

Reference is made to FIG. 4F, which is a flowchart of the function S5 according to an embodiment of the present disclosure.

On the other hand, when the second receiving antenna array Rx2' and the second transmitting antenna array Tx2' are utilized in the service device SV to serve single customer premise equipment CPE, a narrower antenna beam is needed to be selected. In this case, the function S5 should be performed, in which the processing unit is further configured to:

Step S51: control the second antenna controller to control the second receiving antenna array to form a plurality of second radiation patterns having a plurality second radiation directions, respectively.

Step S52: control the second antenna controller to the second receiving antenna array to receive test signals from the CPE through the plurality of second radiation patterns, respectively.

In certain cases, the processing unit PU can control the wireless communication circuit WC to send a test request signal to the customer premise equipment CPE through the out of band signaling, so as to inform the customer premise equipment CPE to enter a test mode and send the test signal as response.

Reference is made to FIG. 4Q which is a flowchart of the function S6 according to an embodiment of the present disclosure. In the function S6, the processing unit PU is configured to:

Step S61: control the power detector PD to detect second signal intensities of the received test signals transmitted in the up-link circuit UL.

Step S62: control the second antenna controller AC2 to select, according to the second signal intensities, one of the second radiation patterns having the maximum second signal intensity for the second receiving antenna array Rx2' and the second transmitting antenna array Tx2' to receive and transmit the signals from the customer premise equipment CPE.

In conclusion, the repeater provided by the present disclosure provides beam selection mechanisms applicable to several scenarios for base stations and CPE, in which the adaptive gain control mechanism can be utilized to reduce the oscillation in the DL circuit and the UL circuit of the control board circuit.

Furthermore, the repeater including an embedded CPE are also provided by the present disclosure, which can provide cost effective and signal boost function for a millimeter wave wireless system, such that the system can be designed to prevent the radio signal oscillation when utilizing the Space Division Duplex (SSD) path loss, antenna nulling, optional polarization diversity between the up-link circuit UL and the down-link circuit DL, and the TDD half-duplex repeater operation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A repeater, comprising:
   a donor device, including a first receiving antenna array, a first transmitting antenna array, and a first antenna controller configured to control the first receiving antenna array and the first transmitting antenna array to receive and transmit data from at least one base station;

a service device, including a second transmitting antenna and a second receiving antenna, and a second antenna controller configured to control the second transmitting antenna and the second receiving antenna to receive and transmit data from and to a customer premise equipment (CPE);

a control board circuit, including:
a down-link (DL) circuit coupled to the first receiving antenna array and the second transmitting antenna; and
an up-link circuit coupled to the second receiving antenna and the first transmitting antenna array; and
a processing circuit, including:
a power detector configured to detect first signal intensities of signals transmitted in the DL circuit;
a processing unit, and
a memory circuit coupled to the processing unit,
wherein the processing unit is configured to:
control the first antenna controller to control the first receiving antenna array to form a plurality of first radiation patterns having a plurality of first radiation directions, respectively;
control the first antenna controller to control the first receiving antenna array to receive signals from at least one base station through the plurality of first radiation patterns, respectively;
control the power detector to detect the first signal intensities of the received signals transmitted in the DL circuit;
control the first antenna controller to select, according to the first signal intensities, one of the first radiation patterns having the maximum first signal intensity for the first receiving antenna array and the first transmitting antenna array to receive and transmit the signals from and to a first base station of the at least one base stations;
control the second antenna controller to send the received signals from the first antenna array to the CPE through the second transmitting antenna;
receive a first feedback signal including connection status of the CPE from the CPE; and
determine, according to the first feedback signal, whether the CPE can be serviced by the first base station,
wherein if the processing unit determines, according to the first feedback signal, that the CPE cannot be serviced by the first base station, the processing unit is further configured to:
control the first antenna controller to select, according to the first signal intensities, one of the first radiation patterns having the secondly maximum signal intensity for the first receiving antenna array and the first transmitting array to receive and transmit signals from and to one of the at least one base station;
control the second antenna controller to send the received signals processed through the down-link circuit to the CPE through the second transmitting antenna;
receive a second feedback signal including the connection status of the CPE from the CPE; and
determine, according to the second feedback signal received by the repeater, whether the CPE can be serviced by the one of the at least one base station.

2. The repeater according to claim 1, wherein the down-link (DL) circuit includes:
a first low noise amplifier (LNA) coupled to the first receiving antenna array;
a first buffer circuit coupled to the first LNA; and
a first power amplifier (PA) coupled between the first buffer circuit and the second transmitting antenna, and wherein the up-link circuit includes:
a second low noise amplifier (LNA) coupled to the second receiving antenna;
a second buffer circuit coupled to the second low noise amplifier; and
a second power amplifier (PA) coupled between the second buffer circuit and the first transmitting antenna array.

3. The repeater according to claim 1, wherein the second receiving antenna and the second transmitting antenna are disposed next to a transceiver of the CPE with a first predetermined distance and a second predetermined distance, respectively.

4. The repeater according to claim 3, further comprising the CPE, wherein the CPE includes the processing unit, and the processing unit is further configured to transmit the first feedback signal including the connection status of the CPE.

5. The repeater according to claim 3, wherein the first predetermined distance and the second predetermined distance range from 1 cm to 50 cm.

6. The repeater according to claim 1, wherein the power detector is further configured to detect second signal intensities of signals transmitted in the UL circuit.

7. The repeater according to claim 6, wherein the processing unit is further configured to generate time duplex division (TDD) synchronization signals for half-duplex controlling the DL circuit and the UL circuit while data transmission between the donor device and the at least one base station and data transmission between the service device and the CPE are performed simultaneously.

8. The repeater according to claim 7, wherein the processing unit is further configured to generate the TDD synchronization signals to respectively enable or disable the DL circuit and the UL circuit according to the first signal intensities and the second signal intensities detected by the power detector.

9. The repeater according to claim 6, wherein the processing unit is further configured to adjust a first gain of the first power amplifier according to the first signal intensities and adjust a second gain of the second power amplifier according to the second signal intensities.

10. The repeater according to claim 6, wherein the service device further includes:
a second receiving antenna array including the second receiving antenna and a plurality of third receiving antennas; and
a second transmitting antenna array including the second transmitting antenna and a plurality of third transmitting antennas.

11. The repeater according to claim 10, wherein the processing unit is further configured to:
control the second antenna controller to control the second receiving antenna array to form a plurality of second radiation patterns having a plurality second radiation directions, respectively;
control the second antenna controller to the second receiving antenna array to receive test signals from the CPE through the plurality of second radiation patterns, respectively;
configure the power detector to detect second signal intensities of the received test signals transmitted in the UL circuit;
control the second antenna controller to select, according to the second signal intensities, one of the second radiation patterns having the maximum second signal intensity for the second receiving antenna array to receive the signals from the CPE.

12. The repeater according to claim 10, wherein the second receiving antenna array and the second transmitting antenna array are omni-directional antenna arrays.

13. The repeater according to claim 1, further comprising a wireless communication circuit configured to receive the first feedback signal.

14. The repeater according to claim 13, wherein a data transmission provided between the service device and the CPE is in a first frequency band, and the first feedback signal is received by the repeater in a second frequency band, and the first frequency band is different from the second frequency band.

15. The repeater according to claim 14, wherein the processing unit is configured to configure the CPE to perform a test mode through the wireless communication circuit in the second frequency band.

16. The repeater according to claim 13, wherein when a rescan request signal from the CPE is received by the wireless communication circuit, or when the processing unit detects that the first signal intensities are less than a predetermined level within a predetermined time of period, the processing unit is further configured to perform the following steps:

configuring the first antenna controller to control the first receiving antenna array to form a plurality of third radiation patterns respectively having a plurality of third radiation direction, and controlling the first receiving antenna array to receive signals from at least one base station through the plurality of third radiation patterns, respectively.

17. The repeater according to claim 1, further comprising a wired communication circuit configured to receive the first feedback signal from the CPE.

* * * * *